July 25, 1961 T. R. STOCKTON ET AL 2,993,499
GOVERNOR MECHANISM
Filed July 25, 1956
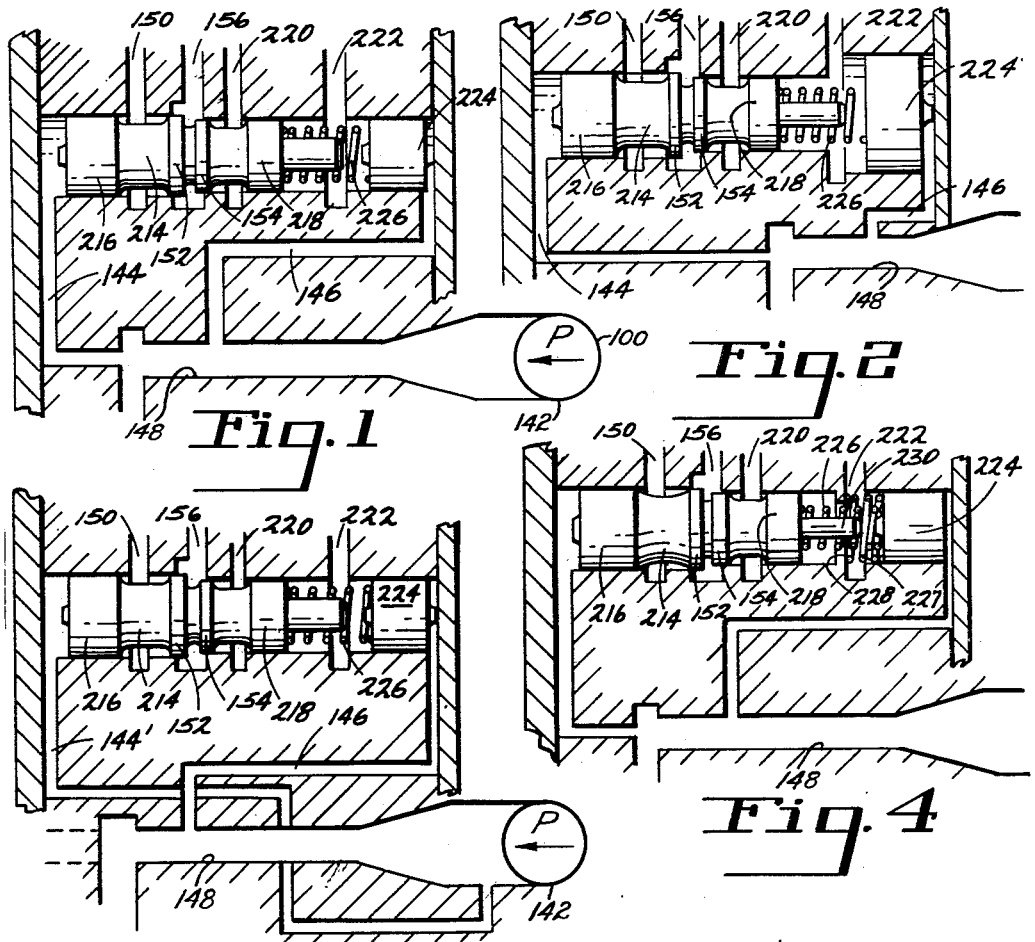
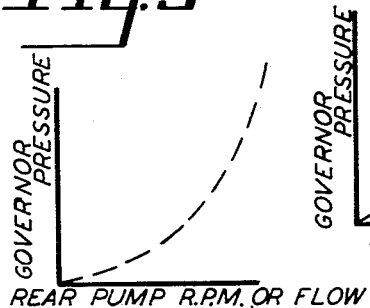
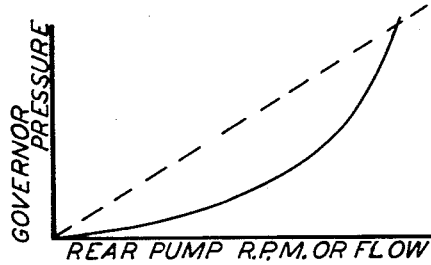
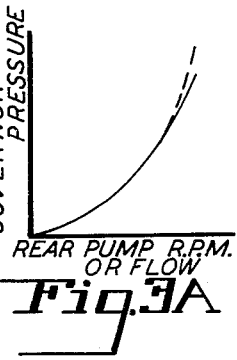
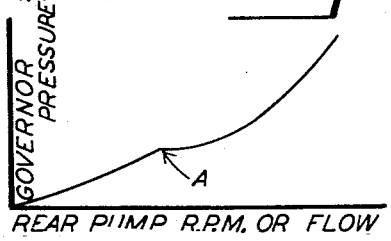
INVENTORS.
THOMAS R. STOCKTON.
NORMAN T. GENERAL.
BY E.C. McRae
J.R. Faulkner.
D.J. Harington
ATTYS.

2,993,499
GOVERNOR MECHANISM

Thomas R. Stockton, Northville, and Norman T. General, Detroit, Mich., assignors to Ford Motor Company, Dearborn, Mich., a corporation of Delaware
Filed July 25, 1956, Ser. No. 599,978
13 Claims. (Cl. 137—100)

Our invention relates generally to an automatic control mechanism and more particularly to a governor mechanism capable of being used therewith for sensing the speed of a driven member and for supplying a control signal which may be utilized to initiate an appropriate regulating function of the control mechanism. The governor mechanism of our instant invention finds particular utility with control valve mechanisms for automatic, multiple speed, power transmissions for automotive vehicles and it is comprised of a movable pressure distributing control valve element capable of providing a vehicle speed signal to initiate shifts from one speed reduction ratio to another during a gear shift sequence.

We are familiar with various control arrangements of known construction for controlling the gear elements of automatic transmissions of the automotive type to obtain the various gear reduction ratios as determined by the operating requirements of the vehicle, and they normally include a fluid pressure operated gear control means and an engine driven fluid pump for pressurizing the same. The fluid circuit interconnecting the pressure source and the fluid pressure operated gear control means includes a shift valve for selectively distributing fluid pressure to various portions of the latter. The shift valve is actuated by an engine torque demand sensitive pressure and by an opposed engine speed sensitive pressure, the former being produced by an engine throttle operated throttle valve and the latter being produced by a transmission output shaft driven fluid pressure governor.

The governor is often comprised of a governor regulator valve drivably connected to the transmission tail shaft so that a movable valve element thereof may be subjected to the centrifugal force created by the rotating tail shaft. This arrangement makes it necessary to design the transmission tail shaft housing with a relatively large transverse dimension in order to accommodate the governor valve and its associated parts. Further, the speed-pressure signal characteristics of such a governor valve are of exponential order and are quite inflexible because of the fixed variation in the forces acting thereon throughout the operating speed range. Further, because of the need for drivably coupling the governor valve to a power output member of the transmission, it becomes necessary with such conventional governor valves to position the same at a relatively remote location which in turn makes it necessary to provide fluid conduits or passages, grooves and fluid seals in order to transmit a fluid control pressure to the governor valve and to conduct governor pressure from the same to the other components of the valve mechanism where it can be properly utilized. Such a governor valve, together with the necessity of providing such fluid passages, greatly adds to the manufacturing cost of the transmission and increases the possibility of operating difficulties.

According to a principal feature of our instant invention, we have overcome these undesirable characteristics inherent in conventional governor devices as above described and have provided a governor mechanism which is substantially more simple in construction and more reliable in operation.

The provision of an improved governor as above set forth being a principal object of our invention, it is a further object of our invention to provide a governor mechanism which may be conveniently used with the valve elements of an automatic transmission control with no additional space being required.

It is a further object of our invention to provide a governor mechanism having operating characteristics which may be readily varied as desired to meet particular operating requirements.

It is a further object of our invention to provide a governor mechanism as set forth in the preceding objects and which is capable of being adapted to any of a variety of control circuits, certain elements normally used with such control circuits being readily adapted to be used with and to form a part of the governor mechanism.

It is a further object of our invention to provide a new and improved governor mechanism as above set forth which is capable of supplying a vehicle speed signal for an automatic transmission control mechanism for wheeled vehicles wherein the magnitude of the signal is a true indicator of vehicle speed with no error compensation being required.

In carrying forth the foregoing objects, we have incorporated our improved governor mechanism within an automatic transmission control circuit including a first engine driven fluid pump and a second or rear pump powered by a power output member of the transmission. In general, our improved governor includes a fluid flow venturi interposed between the discharge side of the rear pump and a control pressure regulator valve for the valve circuit, the latter being effective to regulate the magnitude of the control pressure made available to the remaining portions of the circuit. A plurality of fluid pressure actuated gear control elements are situated within the transmission and communicate with the control circuit, the degree to which they are energized during operation being proportional to the engine torque demand by reason of the operation of the above described regulator valve. One or more shift valves are incorporated in the circuit for selectively distributing fluid pressure from the regulated control pressure to the various fluid pressure responsive elements. An engine torque demand sensitive pressure may be applied to each of the shift valves and a vehicle speed sensitive pressure may be applied thereto for establishing opposed and balanced shift valve actuating forces and to establish predesigned shift points at which the transmission will shift from one gear reduction ratio to another as determined by the operating conditions, the last mentioned pressure being established by the governor mechanism of our instant invention.

Our improved governor mechanism is partly comprised of a governor valve element situated in operative association with the other valves of the circuit, said governor valve element being capable of moving within a governor valve cavity under the influence of opposed fluid pressure forces. One of these forces is obtained by subjecting one end of the governor valve element to the total pressure existing in the region of the venturi and the other force is obtained by subjecting another portion of the governor valve element to the static pressure existing in the throat of the venturi. Regulated control pressure communicates with the governor valve cavity and the governor valve element is effective to modulate the same and to produce a resultant pressure which is equal to the difference between the above mentioned total and static pressures, said difference being equal to the velocity head of the fluid discharged by the rear pump through the venturi. The governor valve element is formed with a differential area on which this resultant velocity pressure may act to produce a force which balances the opposing force produced by the above mentioned differential pressure acting on the governor valve element.

According to certain modifications of our improved governor mechanism, we have adapted the basic structure of the mechanism to modify the resultant velocity pressure, hereinafter referred to as governor pressure, to produce special operating characteristics as desired.

For the purpose of more particularly describing the principle features of our invention, reference will be made to the accompanying drawings wherein:

FIGURE 1 is an enlarged subassembly view of a portion of a control circuit showing a first embodiment of our improved governor mechanism;

FIGURE 1A is a graphical representation of the characteristics of the governor mechanism of FIGURE 1;

FIGURE 2 shows a first modified form of our improved mechanism;

FIGURE 2A is a graphical representation of the characteristics of the governor mechanism of FIGURE 2;

FIGURE 3 shows a further modification of the governor mechanism of our invention;

FIGURE 3A is a graphical representation of the characteristics of the governor mechanism of FIGURE 3;

FIGURE 4 is a third modification of our governor mechanism in which the variation in governor pressure with changes in vehicle speed is of a two-stage nature;

FIGURE 4A is a graphical representation of the characteristics of the governor mechanism of FIGURE 4.

During operation of the vehicle the transmission rear pump, which is identified in FIGURES 1 and 3 by numeral 100, will begin to operate and it will pressurize a pump discharge passage 142. It is seen in FIGURES 1 and 3 that the passage 142 communicates with the intake side of a venturi section which forms a portion of the governor mechanism of our instant invention. The discharge side of the venturi section communicates with the exhaust through the main regulator valve. A passage 144 communicates with the downstream side of the venturi section and extends to one side of the governor valve element or spool shown at 214 to urge the latter in a right hand direction under the influence of the total fluid pressure available in the rear pump discharge circuit. Another passage 146 communicates with the throat portion 148 of the venturi section and it extends to the other side of the governor valve for urging the latter in the opposite direction, the pressure thereby made available to the right side of the governor valve being equal to the static pressure. Since the total pressure in the region of the venturi section is equal to the sum of the velocity pressure and the static pressure, the force differential acting on the governor valve will be equal to that force which is due only to velocity pressure.

The governor valve spool is slidably positioned in a valve chamber which communicates with a control pressure passage 150, said valve chamber being formed in the control valve body for the transmission control circuit. The governor valve is formed with a first valve land 152 and an adjacent valve land 154 of somewhat reduced diameter thereby creating an annular area. A governor pressure passage 156 communicates with the governor valve chamber adjacent the annular area defined by the valve lands 152 and 154 and is uncovered by the valve land 152 as the governor valve is shifted in a right hand direction under the influence of the pressure differential above described. This shifting movement provides a restricted communication between the control pressure passage 150 and the governor passage 156 so as to produce a governor pressure in the latter which may act on the above mentioned annular area of the governor valve. It will thus be apparent that the governor pressure thus produced will be equal to the magnitude of the velocity pressure component of the total pressure existing in the region of the venturi.

Valve spool 214 has formed thereon spaced valve lands 216 and 218 which are respectively paired with the aforementioned lands 152 and 154, the diameters of the lands 216 and 152 being substantially greater than the diameters of the valve lands 154 and 218. The valve element 214 is positioned within a valve chamber which communicates with control pressure passage 150 at a point intermediate valve lands 216 and 152. The governor pressure passage 156 communicates with the valve chamber at a point adjacent the valve lands 152 and 154, as previously described, and the portion of the valve chamber intermediate the valve lands 154 and 218 and the chamber to the right of the valve land 218 is open to exhaust through ports 220 and 222 respectively. These exhaust ports prevent trapping of fluid in the region between valve lands 154 and 218 and in the region at the right end of valve spool 214. A separate valve plunger 224 is situated at one end of the valve chamber and a valve spring 226 is interposed between the plunger 224 and the valve element 214 for normally urging the latter in a left hand direction as viewed in FIGURE 3. The static pressure delivered to the right side of the plunger 224 through branch passage 146 creates a pressure force which is transmitted through the valve spring 226 to the valve element 214 to oppose a pressure force created by the total pressure distributed to the left side of the valve element 214 through the branch passage 144. Since the magnitude of the total pressure acting on the left side of the valve element 214 is greater than the static pressure force acting on the right side of the plunger 224, the valve element 214 will open communication between passage 150 and governor pressure passage 156 thereby causing the differential area between the valve lands 152 and 154 to be subjected to a modulated control pressure, the magnitude of this pressure being equal to the velocity pressure in the region of the venturi as previously explained. This modulated control pressure may be utilized in the transmission control circuit as a governor pressure in the manner previously described to establish the various shift points during a given shift sequence for the transmission. It may be shown that the governor pressure is equal to the quantity $$\frac{(P_t - P_s)A_1}{A_1 - A_2}$$

which is equal to the expression $$\frac{P_v - A_1}{A_1 - A_2}$$

where $P_t = P_s + P_v$ = total pressure, $P_v$ = pressure due to velocity, $P_s$ = static pressure, $A_1 - A_2$ = area acted on by governor pressure and where $A_1$ = area acted on by $P_t$ and $P_s$. The spring is used merely for venting purposes when the vehicle is stopped.

By changing the venturi bore and the ratio $$\frac{A_1}{A_1 - A_2}$$

a plurality of governor characteristics may be obtained. For purposes of illustration, we have shown in FIGURE 1A one of a family of governor curves which may be obtained for any given value for the area ratio and for any given venturi bore diameter.

Referring next to FIGURE 2, we have illustrated a modification of our invention capable of supplying a governor pressure signal which is substantially greater in magnitude than the corresponding pressure signal which may be obtained from the embodiment of FIGURE 1 for a given road speed.

The corresponding parts in the embodiments of FIGURES 1 and 2 are identified by similar reference characters. However, the embodiment of FIGURE 2 is characterized by a plunger element 224' which is substantially greater in diameter than the diameter of the corresponding plunger element 224 of FIGURE 1. This tends to increase the rate of change in the magnitude of the governor pressure relative to the corresponding governor pressure of the embodiment of FIGURE 1 at the lower speeds and to decrease the rate of change in the magnitude of the governor pressure relative to the governor pressure of the embodiment of FIGURE 1 at the higher vehicle speeds. This tends to make the variation in governor pressure with changes in vehicle speed substantially linear as illustrated in the plot of FIGURE 2A.

It may be shown that the governor pressure supplied by the governor mechanism of FIGURE 2 may be represented by the expression $$\frac{P_v \times A_1}{A_1 - A_2} - \frac{P_s \times (A_3 - A_1)}{A_1 - A_2}$$

where $P_v$=pressure due to velocity, where $A_1$=the area acted on by $P_t$, where $P_t = P_s + P_v$=total pressure, where $P_s$=static pressure in the venturi bore, where $A_1 - A_2$=area acted on by governor pressure and where $A_3$=area acted on by $P_s$. By way of contrast, we have plotted by means of a full line in FIGURE 2A the governor characteristics of the governor mechanism of FIGURE 1 having equal corresponding dimensions, the governor characteristics of the modification of FIGURE 2 being illustrated by means of a dotted line. It is thus apparent that a variety of governor characteristics may be obtained by varying the above area ratios, the spring characteristics and the dimensions of the venturi as desired.

Referring next to FIGURE 3, we have illustrated a third embodiment of our invention which is capable of supplying a somewhat stronger governor pressure signal at the higher vehicle speeds, the magnitude of the governor pressure being a more accurate indicator of vehicle speed than the corresponding signal obtained with the embodiment of FIGURE 1. The structure of the mechanism of FIGURE 3 is substantially identical to that previously described in connection with FIGURE 1. However, the total pressure pickup is obtained at a point upstream from the venturi throat rather than at a downstream location, the passage 144' in FIGURE 3 replacing passage 144 in FIGURE 1. The governor mechanism of FIGURE 3 is therefore not sensitive to fluid friction losses occurring in the region of the venturi during operation. Since these losses are of significance only at the higher flow rates, the change in the governor characteristics over those obtained with the structure of FIGURE 1 will be quite imperceptible at the lower vehicle speeds but they may be noticeable at the higher vehicle speeds. By way of illustration, we have plotted in FIGURE 3A the governor characteristics obtainable with the governor mechanism of FIGURE 3 for any given set of dimensions and have superimposed on this same plot the corresponding characteristics obtainable with the governor mechanism of FIGURE 1 having equal corresponding dimensions, the latter being illustrated with a full line and the former being illustrated with a dotted line.

The basic governor mechanism briefly described may also be altered somewhat so as to produce modified governor characteristics wherein the magnitude of the governor signal obtained at the higher vehicle speeds may be of a reduced magnitude and wherein the governor signal obtained at vehicle speeds less than a predetermined value may remain substantially unaltered. For example, in the governor mechanism of FIGURE 4, we have introduced a second governor spring to supplement the action of the single governor spring utilized in the previously described embodiments. The other physical characteristics of the mechanism of FIGURE 4 may otherwise be substantially identical to any one of the previously described embodiments. However, for purposes of illustration, we have made the mechanism of FIGURE 4 similar to that of FIGURE 1. In addition, we have interposed a second valve spring 227 between the valve plunger 224 and a relatively stationary valve spring seat 228. In operation it will be apparent that a portion of the force exerted on the valve plunger 224 by the static pressure existing in the throat of the venturi will be transmitted to the valve element 214 through the spring 226 while the remaining portion is absorbed by spring 227. When the static pressure increases sufficiently to cause the valve plunger 224 to seat against an extension 230 of the valve element 214, further compression of the spring 226 will be prevented and further movement of the valve plunger 224 will be resisted only by the valve spring 227. It is thus apparent that the rate of change in the governor pressure for a given change in vehicle speed will be substantially less after the valve plunger 224 contacts the valve element 214 than the corresponding rate of change which exists before such contact takes place. For purposes of illustration, we have illustrated in FIGURE 4A a plot of the governor pressure for a variety of vehicle speeds, and it will be observed that at point "A" the slope of the curve suddenly changes to a lesser value by reason of the contact between the valve plunger 224 and the valve element 214. It is thus apparent that an effective vehicle speed signal of substantial magnitude will be obtainable at relatively high vehicle speeds thus greatly increasing the effective speed range over which the automatic shift valves will respond to changes in vehicle speeds.

Although we have described certain preferred embodiments of our invention, it is apparent that other modifications thereto may also be made without departing from the scope of our invention as defined by the following claims.

We claim:

1. A governor mechanism for providing a governor pressure signal functionally related in magnitude to the speed of a rotating member, a valve body, a governor valve chamber formed in said valve body, a governor valve element located in said valve chamber, a movable member located in said valve chamber, a fluid flow passage, a venturi section formed in said flow passage, said venturi section including a throat portion and an adjacent portion, means for subjecting one portion of said valve element to the total pressure in said adjacent portion of said venturi section, means for subjecting one portion of said movable member to the static pressure existing in the throat portion of said venturi section, a yieldable force transmitting connection between said valve element and said movable member adapted to transmit a static pressure force to said valve element when the magnitude of the static pressure in the throat portion of said venturi section is within a predetermined range, a governor pressure passage communicating with said valve chamber, said valve element being adapted to control the degree of communication between said governor pressure passage and a second flow passage, means for yieldably opposing the fluid pressure force exerted by said static pressure force on said movable member, and means for providing a positive static pressure force transfer between said valve member and said movable member when the magnitude of said static pressure exceeds said predetermined range.

2. In a governor mechanism for providing a governor pressure signal functionally related in magnitude to the speed of rotation of a rotary member, a pump drivably connected to said rotary member, a valve body, a governor valve chamber formed in said valve body, a valve element in said valve chamber, conduit structure in fluid communication with said pump including a venturi having a throat of relatively reduced cross sectional area and a portion adjacent said throat, said venturi being adapted to accommodate a flow of fluid therethrough the velocity of which is functionally related in magnitude to the rotary speed of said rotary member which during normally continuous operation is subjected to variations in speed, one portion of said valve element being subjected to the total fluid pressure existing in said adjacent portion of said venturi to bias the valve element in one direction, means for subjecting another portion of said valve element to the static pressure in said throat of said venturi to bias said valve element in another direction, a governor pressure passage extending from said valve chamber, a control pressure passage communicating with said valve chamber, said valve element being adapted to control the degree of communication between said governor pressure passage and said control pressure passage to establish and maintain a governor pressure in said governor pressure passage, and a governor pressure area on said valve element, said governor pressure acting on said governor pressure area to supplement the biasing action of said static pressure.

3. In a speed governor mechanism for establishing a governor pressure signal which is functionally related in magnitude to the speed of rotation of a rotating member, conduit structure including a venturi section adapted to accommodate a fluid flow therethrough which is functionally related in magnitude to the speed of rotation of said rotating member which during normally continuous operation is subjected to variations in speed, said venturi section including a throat portion and an adjacent portion, a governor pressure passage, a control pressure passage, a governor valve means for providing restricted communication between said governor pressure passage and said control pressure passage, opposed working areas formed on said governor valve means, and dual passage means for conducting fluid pressure from said throat portion and from said adjacent portion of said venturi section to each of said opposed working areas respectively thereby establishing unbalanced pressure forces, another portion of said governor valve means being subjected to the pressure existing in said governor pressure passage for producing a regulating force which tends to balance the aforesaid pressure forces.

4. In a governor mechanism for providing a governor pressure signal functionally related in magnitude to the speed of rotation of a rotating member, a fluid flow passage including a venturi section, said venturi section having a throat portion and an adjacent portion and the velocity of flow therethrough being functionally related to the rotating speed of said rotating member which during normally continuous operation is subjected to variations in speed, a governor pressure passage, a control pressure passage, governor valve means for providing restricted communication between said governor pressure passage and said control pressure passage, one portion of said governor valve means communicating with the throat portion of said venturi section and another portion of said governor valve means communicating with said adjacent portion of said venturi section, each portion of said governor valve means being characterized by a fluid pressure working area whereby opposed fluid pressure forces are established for actuating said governor valve means, the working area associated with said one portion being substantially larger than the working area associated with said other portion and a governor pressure area formed on said governor valve means, said governor pressure area being in fluid communication with said governor pressure passage whereby the fluid pressure force acting on said one portion is supplemented by a governor pressure force.

5. In a governor mechanism for providing a governor pressure signal functionally related in magnitude to the speed of rotation of a rotating member, a fluid flow passage including a venturi section, said venturi section including a throat and an adjacent portion and the velocity of flow therethrough being functionally related to the rotating speed of said rotating member which during normally continuous operation is subjected to variations in speed, a governor pressure passage, a control pressure passage, governor valve means for providing restricted communication between said governor pressure passage and said control pressure passage, one portion of said governor valve means communicating with the throat of said venturi section and another portion of said governor valve means communicating with said adjacent portion of said venturi section, each of said portions of said governor valve means being characterized by a fluid pressure working area whereby opposed pressure forces are established for actuating said governor valve means, a governor pressure area formed on said governor valve means, said governor pressure area being in fluid communication with said governor pressure passage, the pressure in said governor pressure passage acting on said governor valve means tending to balance the forces created by the fluid pressure acting on said working areas.

6. In a governor mechanism for providing a governor pressure signal functionally related in magnitude to the speed of rotation of a rotating member, a fluid flow passage including a venturi section, said venturi section including a throat and an adjacent portion and the velocity of flow therethrough being functionally related to the rotating speed of said rotating member which during normally continuous operation is subjected to variations in speed, a governor pressure passage, a control pressure passage, governor valve means for providing restricted communication between said governor pressure passage and said control pressure passage, said governor valve means including a movable valve element having opposed fluid working areas of unequal size, a first branch passage for conducting fluid pressure from the throat of said venturi section to the larger of said working areas, a second branch passage for conducting fluid pressure from said adjacent portion of said venturi section to the other working area, and a governor pressure area formed on said movable valve element, said governor pressure passage being in fluid communication with said governor pressure area, said governor valve means thereby maintaining a governor pressure in said governor pressure passage which acts on said movable valve element and tends to oppose and balance the pressure forces acting on said unequal areas.

7. In a governor mechanism for providing a governor pressure signal that is proportional in magnitude to the speed of rotation of a rotary member which during normally continuous operation is subjected to variations in speed, a valve body, a governor valve chamber formed in said valve body, a governor valve element disposed within said valve chamber, conduit structure including a venturi forming a portion thereof, a fluid displacement means drivably connected to said rotary member for supplying fluid to said conduit structure, said venturi including a throat of reduced cross sectional area and a portion adjacent said throat, a first and a second passage means extending from said venturi to said valve chamber for respectively subjecting one portion of said valve element to the total fluid pressure in said adjacent portion of said venturi and for subjecting another portion thereof to the static pressure existing in the throat of said venturi, said total pressure and said static pressure establishing valve element actuating forces, a control pressure passage and a governor pressure passage extending to said valve chamber at separate locations, said valve element being adapted to control the degree of communication between said control pressure passage and said governor pressure passage whereby a governor pressure is established in said governor pressure passage, said valve element being formed with a control area on which said governor pressure acts to establish a governor pressure force thereon.

8. In a speed governor mechanism for providing a governor pressure signal that is functionally related in magnitude to the speed of rotation of a rotary member which during normally continuous operation is subjected to variations in speed, fluid conduit structure including a venturi section having a throat portion and an adjacent portion, fluid displacement means for supplying fluid to said conduit structure, a governor pressure passage, a governor valve means for providing restricted communication between said governor pressure passage and said conduit structure whereby a governor pressure is established in said governor pressure passage which is proportional in magnitude to the flow velocity in said conduit structure, opposed working areas formed on said governor valve means, and dual passage means for conducting fluid pressure from the throat portion of said venturi section and from said adjacent portion of said venturi section to each of said opposed working areas respectively, a governor pressure area formed on said governor valve means, said governor pressure passage being in fluid communication with said governor pressure area whereby the latter is subjected to governor pressure, said governor pressure, the pressure in said throat and the pressure in said adjacent portion establishing actuating forces for said governor valve means.

9. The combination as set forth in claim 8 wherein said opposed areas are of unequal size.

10. The combination as set forth in claim 8 wherein the static pressure existing in said throat portion is caused to act on one of said opposed working areas and wherein the total pressure existing on the downstream side of said venturi section acts on the other working area.

11. The combination as set forth in claim 8 wherein the static pressure existing in said throat portion is caused to act on one of said opposed working areas and wherein the total pressure existing on the upstream side of said venturi section acts on the other working area.

12. In a speed governor mechanism, a valve body, a governor valve chamber formed in said valve body, a bipartite governor valve member situated in said valve chamber, spring means interposed between separate parts of said valve member, conduit structure communicating with said valve chamber, said conduit structure being adapted to accommodate a fluid flow of varying velocity, said conduit structure including a venturi section, said venturi section including a venturi throat and an adjacent portion, passage means for subjecting one part of said valve member to the total pressure in said adjacent portion of said venturi section and for subjecting another part of said valve member to the static pressure existing in the throat of said venturi section, the resulting force established by said static pressure on said other part being transmitted to said one part through said spring means, a control pressure passage and a governor pressure passage communicating with said valve chamber, said one valve part controlling the degree of communication between said governor pressure passage and said control pressure passage, and a third working area formed on said one valve part, said governor pressure acting on said third working area to supplement the biasing action of said static pressure.

13. The combination as set forth in claim 12 wherein said spring means is comprised of two separate spring elements and wherein said valve body includes a spring seat, said valve parts including engageable portions, said other valve part being urged into engagement with said one valve part upon an increase in the static pressure in the region of said venturi section to a predetermined value, one of said spring elements being situated between and acting against each of said valve parts and the other of said spring elements acting between said other valve part and said spring seat, the rate of change in governor pressure at flow velocities in said conduit structure less than a predetermined limiting value thereby being greater than the corresponding rate of change in governor pressure for a given change in flow velocity in said conduit structure at values greater than said predetermined limiting value.

References Cited in the file of this patent

UNITED STATES PATENTS

| | | |
|---|---|---|
| 2,255,787 | Kendrick | Sept. 16, 1941 |
| 2,401,012 | Ornstein | May 28, 1946 |
| 2,665,707 | Stover | Jan. 12, 1954 |
| 2,737,824 | Livermore | Mar. 13, 1956 |
| 2,778,371 | Dannevig | Jan. 22, 1957 |